United States Patent

Fukasawa et al.

[19]

[11] Patent Number: 5,920,591
[45] Date of Patent: Jul. 6, 1999

[54] SPREADING CODE GENERATOR AND CDMA COMMUNICATION SYSTEM

[75] Inventors: Atsushi Fukasawa; Toshio Kato; Manabu Kawabe; Shinichi Sato; Kiyoki Sekine, all of Tokyo, Japan

[73] Assignee: Oki Electric Industry Co., Ltd., Tokyo, Japan

[21] Appl. No.: 08/679,925

[22] Filed: Jul. 15, 1996

[30] Foreign Application Priority Data

Jul. 27, 1995 [JP] Japan ........................... 7-192062

[51] Int. Cl.⁶ ................. H04B 15/00; H04K 1/00; H04L 27/30
[52] U.S. Cl. .................. 375/208; 375/206; 375/295; 370/320
[58] Field of Search ................... 375/200, 208, 375/206, 209, 210, 295; 455/65; 370/320, 310, 335, 441

[56] References Cited

U.S. PATENT DOCUMENTS

| | | |
|---|---|---|
| 5,103,459 | 4/1992 | Gilhousen et al. |
| 5,228,056 | 7/1993 | Schilling . |
| 5,416,797 | 5/1995 | Gilhousen et al. ................. 375/200 |
| 5,497,395 | 3/1996 | Jou ................................ 375/200 |
| 5,614,914 | 3/1997 | Bolgiano et al. .................. 342/364 |
| 5,663,990 | 9/1997 | Bolgiano et al. .................. 375/200 |

OTHER PUBLICATIONS

G.R. Cooper and R.W. Nettleton, "A Spread–Spectrum Technique for High–Capacity Mobile Communications," IEEE Transactions on Vehicular Technology, vol. VT–27, No. 4, 1978, pp. 264–275.

*Primary Examiner*—Chi H. Pham
*Assistant Examiner*—Bryan Webster
*Attorney, Agent, or Firm*—VENABLE; Robert J. Frank; Michael A. Sartori

[57] ABSTRACT

A spreading code generator generates a spreading code by modulo-two addition of two internal spreading codes. The first internal spreading code is part of a pseudorandom noise sequence, created by resetting a pseudorandom noise generator to an assigned initial state at intervals determined by counting a framing signal. The second spreading code is selected from a set of preferably orthogonal sequences, the selected sequence being repeated at intervals shorter than the period of the framing signal. A code-division multiple-access communication system employs this spreading code generator to generate all spreading codes used at all communicating stations. One of the spreading codes generated at each station is transmitted as a synchronization signal.

30 Claims, 10 Drawing Sheets

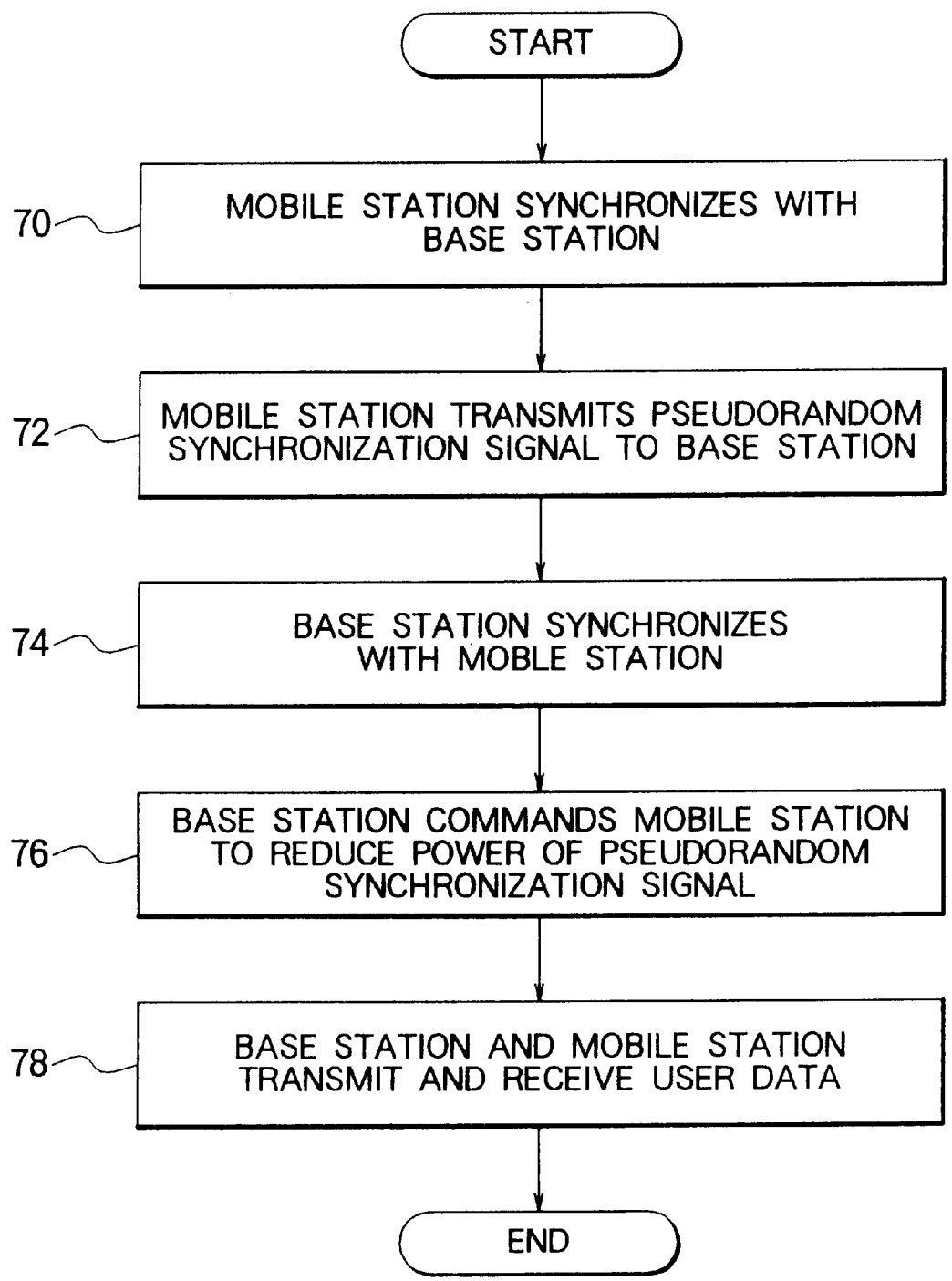

SPREADING CODE GENERATOR AND CDMA COMMUNICATION SYSTEM

BACKGROUND OF THE INVENTION

The present invention relates to a spreading code generator, and to a direct-sequence code-division multiple-access communication system using this spreading code generator for both transmitting and receiving at all stations.

Direct-sequence code-division multiple-access (which is properly abbreviated as DS-CDMA, but will be referred to below simply as CDMA) is a type of spread-spectrum communication system in which multiple signal channels occupy the same frequency band, being distinguished by the use of different spreading codes. CDMA communication is employed in, for example, digital cellular telephone systems and personal communication services. In these systems, a base station communicates with a plurality of mobile stations, one frequency band being used for all of the up-links from the mobile stations to the base station, and another frequency band being used for all of the down-links from the base station to the mobile stations.

Conventional CDMA systems have employed different modulation techniques on the up-links and down-links. U.S. Pat. No. 5,103,459, for example, describes a system in which a base station spreads data signals destined for different mobile stations by mutually orthogonal codes, while each mobile station uses all of the orthogonal codes for m-ary encoding of data to be transmitted to the base station. The base and mobile stations also employ pseudo-random noise codes with different periods, and the base station transmits all channels synchronously, signal while the mobile stations transmit asynchronously.

All of the orthogonal codes and pseudorandom codes employed in this system can be described as spreading codes, meaning that they have a higher bit rate or "chip" rate than the bit rate of the transmitted data, but due to the major differences in code structure and usage between the base and mobile stations, each station requires at least two different types of spreading code generators. Moreover, the spreading demodulators at the base station differ in structure from the spreading demodulators at the mobile stations. A resulting disadvantage to the manufacturer is the need to design and manufacture various different types of spreading code generators and demodulating circuits, raising the overall cost of the communication system.

SUMMARY OF THE INVENTION

It is accordingly an object of the present invention to provide a single spreading code generator that can be used on both the up-links and down-links of a CDMA communication system, to spread all transmitted signals.

Another object of the invention is to provide a CDMA communication system in which a base station can communicate simultaneously with a large number of mobile stations.

A further object is to provide a CDMA communication system in which each station transmits a single synchronization signal for bit, frame, and code synchronization.

A still further object is to enable a base station to resynchronize quickly with a mobile station.

A yet further object is to prevent a base station from mistaking the synchronization signal of one mobile station for the synchronization signal of another mobile station.

The invented spreading code generator receives initialization data, a control parameter, a chip clock signal, and a framing signal. A first spreading code generating circuit generates a first spreading code in synchronization with the chip clock signal, and reassures an initial state determined by the initialization data at intervals determined by the framing signal. A second spreading code generating circuit generates a second spreading code in synchronization with the chip clock signal, the second spreading code being selected by the control parameter and having a repeating period shorter than the framing signal period. A modulo-two adder adds the first and second spreading codes to produce a third spreading code, which is output from the spreading code generator.

The invented CDMA communication system has a plurality of stations, each of which transmits signals on at least two channels distinguished by different transmit spreading codes. These transmit spreading codes are generated by transmit spreading code generators of the invented type. Different stations are preferably distinguished by different initialization data, and different transmit spreading code generators at the same station by different control parameters. The transmit spreading code generators at the same station are synchronized by a single chip clock signal and a single framing signal. Each station also receives a radio-frequency signal, demodulates this signal to a baseband signal, then despreads the baseband signal by correlating the baseband signal with spreading codes generated by receive spreading code generators of the invented type.

To receive signals from a first station, a second station assigns initialization data and control parameters to two or more of its receive spreading code generators so that these spreading code generators generate the spreading codes that were used in transmitting the signals at the first station. A synchronizer at the second station generates a chip clock signal and a framing signal responsive to the output of a correlator coupled to one of the above-mentioned two or more receive spreading code generators, and supplies these chip clock and framing signals to all of the above-mentioned two or more receive spreading code generators, thereby synchronizing these receive spreading code generators with the first, station.

In a CDMA communication system having base stations and mobile stations, the mobile stations preferably also synchronize their transmit spreading code generators with the framing signal output by the synchronizer.

BRIEF DESCRIPTION OF THE DRAWINGS

In the accompanying drawings:

FIG. 11 is a flowchart illustrating a procedure for communication in the invented CDMA communication system.

DETAILED DESCRIPTION OF THE INVENTION

Embodiments of the invention will be described with reference to the attached illustrative drawings, First the invented spreading code generator will be described; then the invented CDMA communication system will be described.

Figure 1:
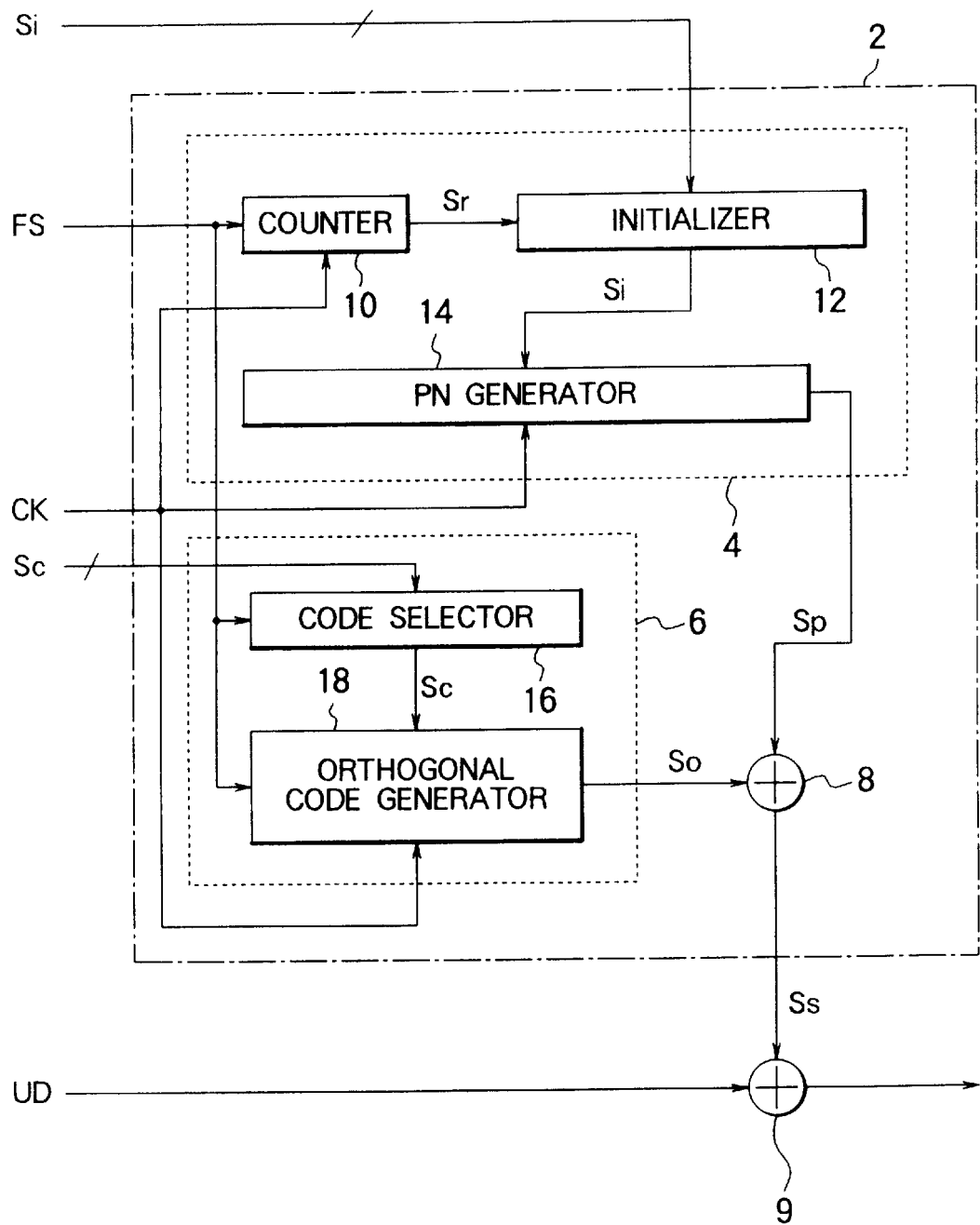
FIG. 1 is a block diagram of the invented spreading code generator.

Referring to FIG. 1, the invented spreading code generator 2 comprises two spreading code generating circuits 4 and 6 and a modulo-two adder 8.

The first spreading code generating circuit 4 receives a framing signal FS, a chip clock signal CK, and initialization data Si, and generates a first spreading code Sp. At intervals determined by the framing signal FS, the first spreading code generating circuit 4 an initial state determined by the initialization data Si.

The second spreading code generating circuit 6 receives the chip clock signal CK and framing signal FS and a control parameter Sc, and generates a second spreading code So. The second spreading code So is selected from a predetermined set of spreading codes by the control parameter Sc.

The modulo-two adder 8 takes the chip-wise sum, modulo two, of the first and second spreading codes Sp and So to produce a third spreading code Ss. The first and second spreading codes Sp and So are internal spreading codes. Only the third spreading code Ss is output from the spreading code generator 2.

The spreading code Ss output from the spreading code generator 2 can be used to spread user data UD, in which case the spreading code Ss and user data UD are supplied to another modulo-two adder 9 as shown. The output spreading code Ss can also be used as a pseudorandom synchronization signal, as described later.

The spreading codes Sp, So, and Ss comprise chips that are output in synchronization with the chip clock signal CK. The spreading codes are also synchronized with the framing signal FS, but the first spreading code Sp has a longer period than the second spreading code So. Incidentally, the period of a spreading code refers to the repeating period: the length of the interval at which the same chip sequence repeats.

In the following description, the spreading-code chips and user data bits will be regarded as having values of zero or one, which the modulo-two adders 8 and 9 add according to the rule that 1+1=0.

It is also possible to regard the chips and data bits as having values of plus or minus one (+1 or −1), in which case the modulo-two adders 8 and 9 should be regarded as multipliers. In either case, the modulo-two adders operate according to exclusive-OR logic, with like input values producing one output value, and unlike input values producing another output value.

FIG. 1 illustrates a preferred embodiment of the invented spreading code generator 2, in which the first spreading code Sp is part of a pseudorandom noise (PN) sequence. A PN sequence is any chip sequence with substantially equal numbers of zero's and one's, which do not occur in any regular pattern. The first spreading code generating circuit 4 comprises a counter 10, an initializer 12, and a PN generator 14. The counter 10 counts user data frames as indicated by the framing signal FS, and generates a reset signal Sr. The reset signal Sr causes the initialization data Si to be loaded from the initializer 12 into the PN generator 14, which then generates the first spreading code Sp.

In this embodiment, the second spreading code So is selected from a set of mutually orthogonal chip sequences. The second spreading code generating circuit 6 comprises a code selector 16 for storing the control parameter Sc, and an orthogonal code generator 18 for outputting the orthogonal chip sequence selected by Sc as the second spreading code So.

More detailed descriptions of the structure and operation of the first spreading code generating circuit 4 will be given next.

Figure 2:
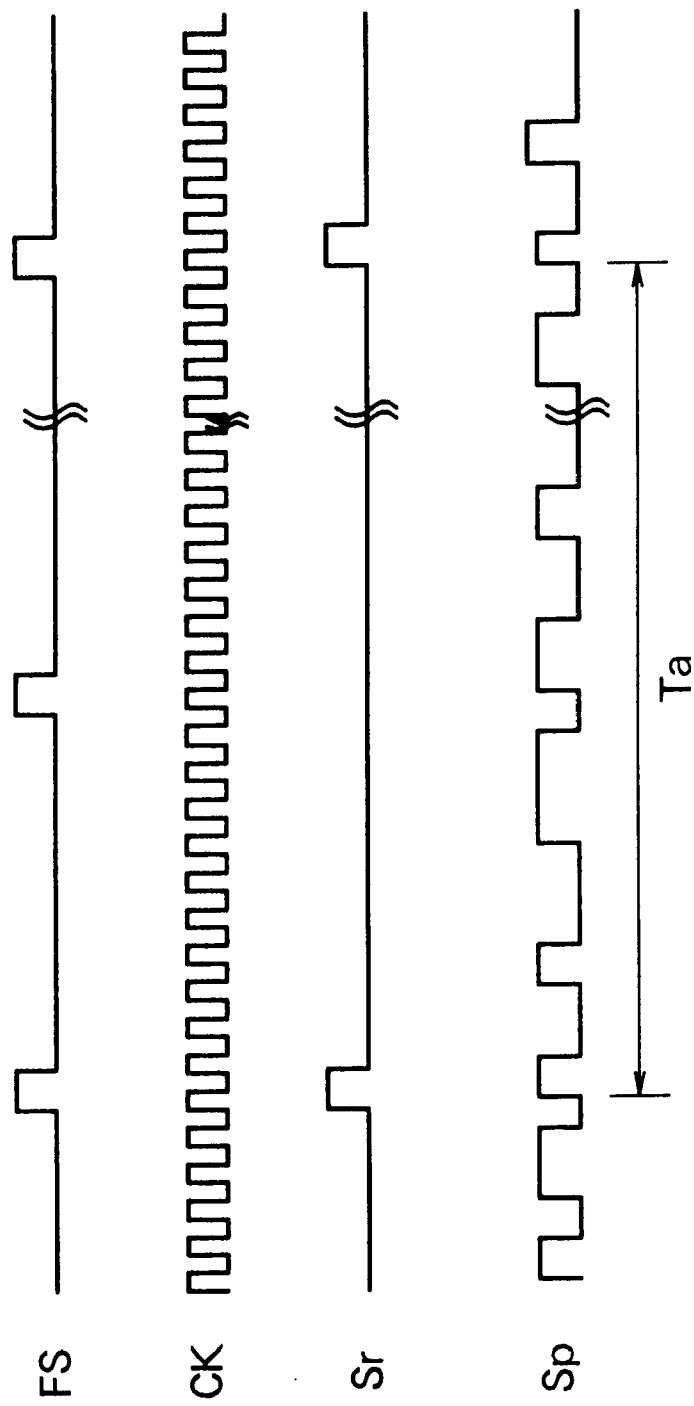
FIG. 2 is a timing diagram illustrating the operation of the first code generating circuit in FIG. 1.

FIG. 2 shows waveforms of the framing signal FS, chip clock signal CK, reset signal Sr, and first spreading code Sp. The counter 10 counts frame pulses (FS) and generates one reset signal Sr for every K pulses, where K is a fixed positive integer. Since the PN generator 14 is reset to the same initial state at every reset signal Sr, the chip sequence of the first spreading code Sp repeats at intervals Ta equal to the frame period multiplied by K. In FIG. 2, K is greater than one, but it is possible for K to be equal to one, in which case the framing signal FS and reset signal Sr are identical and the counter 10 can be eliminated.

Figure 3:
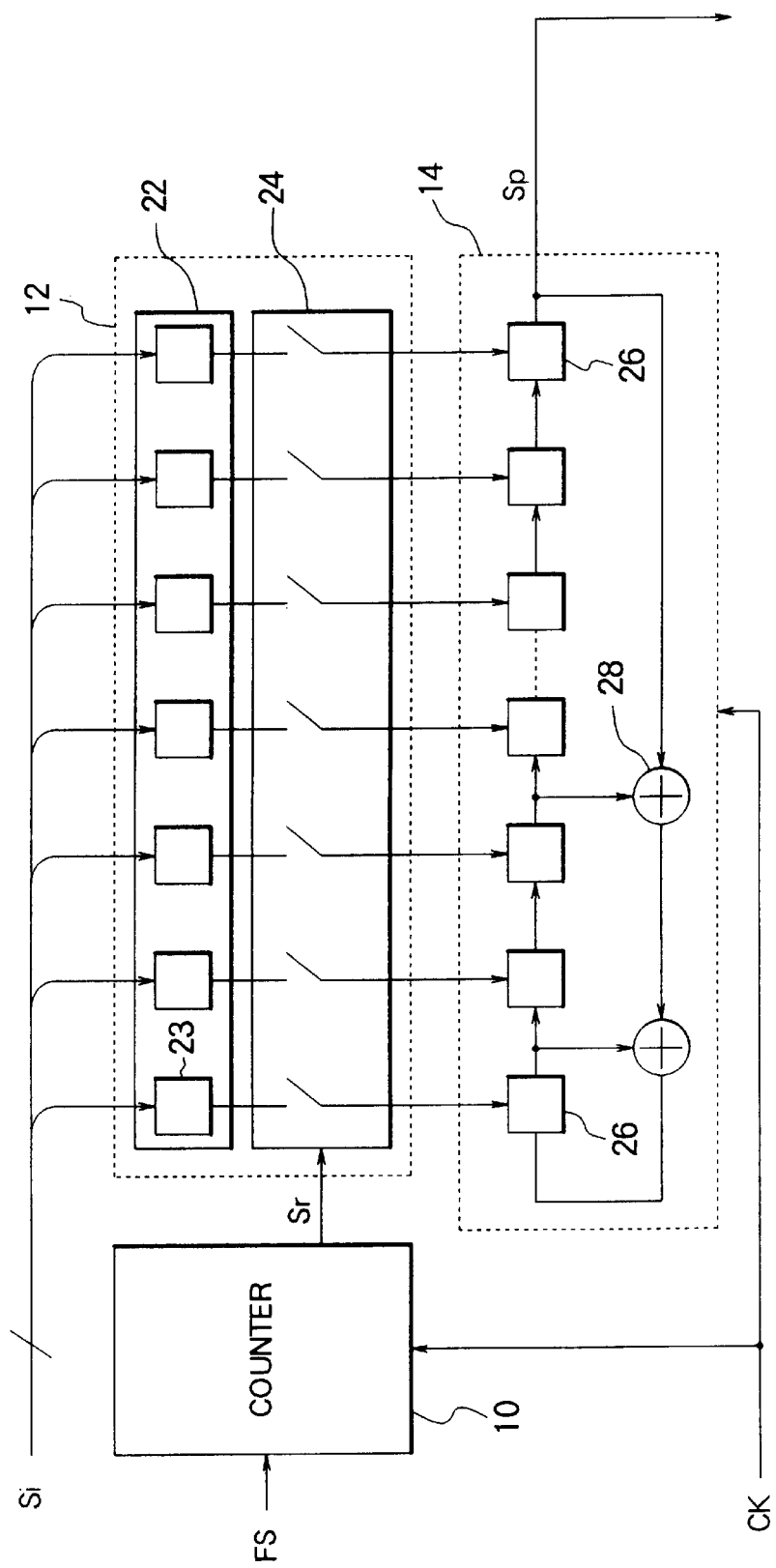
FIG. 3 is a block diagram illustrating one preferred configuration of the first code generating circuit in FIG. 1.

FIG. 3 shows one example of a preferred structure of the initializer 12 and PN generator 14. The initializer 12 comprises a register 22 with latches 23 for storing the initialization data Si, and a switching circuit 24. The PN generator 14 is a linear-feedback shift register comprising latches 26 and modulo-two adders 28, coupled so that the leftmost latch 26 receives the sum, modulo two, of the outputs of certain other latches 26. These other latches are preferably selected so as to produce a chip sequence having a period of maximum length.

A linear-feedback shift register can be conveniently described by a generator polynomial, the non-zero coefficients of which correspond to the positions of the modulo-two adders 28. As one example, if there are thirty-two latches 26, the generator polynomial $g(x)=x^{32}+x^2+_1$ produces a maximum-length chip sequence.

The operation of the first spreading code generating circuit 4 in FIG. 3 is, briefly, as follows. At every cycle of the chip clock signal CK, the value in each latch 26 is shifted into the next Latch to the right, with feedback through the modulo-two adders 28 to the leftmost latch. The value in the rightmost latch 26 is output as one chip of the first spreading code Sp. For the generator polynomial given above, in the absence of a reset signal Sr, the resulting sequence would have a period of more than four thousand million chips ($2^{32}-1$ chips, to be precise).

As shown in FIG. 2, however, at every reset signal Sr the PN generator 14 is reset and begins again from the same initial state, given by the initialization data Si. Thus only a part of the maximum-length sequence that could be output from the PN generator 14 is actually produced as the first spreading code Sp. The first spreading code Sp consists of repetitions of this part.

Although no restrictions are placed on the interval between reset signals Sr, in typical CDMA systems this interval will be less than one million chips. With the above generating polynomial, it is then possible to obtain thousands of different, non-overlapping spreading codes Sp, by changing the initialization data Si. Due to the pseudorandom nature of the output of the PN generator 14, the cross-correlation between any two of these first spreading codes Sp will be close to zero, i.e. the two codes will agree in substantially half of their chips.

Figure 4:
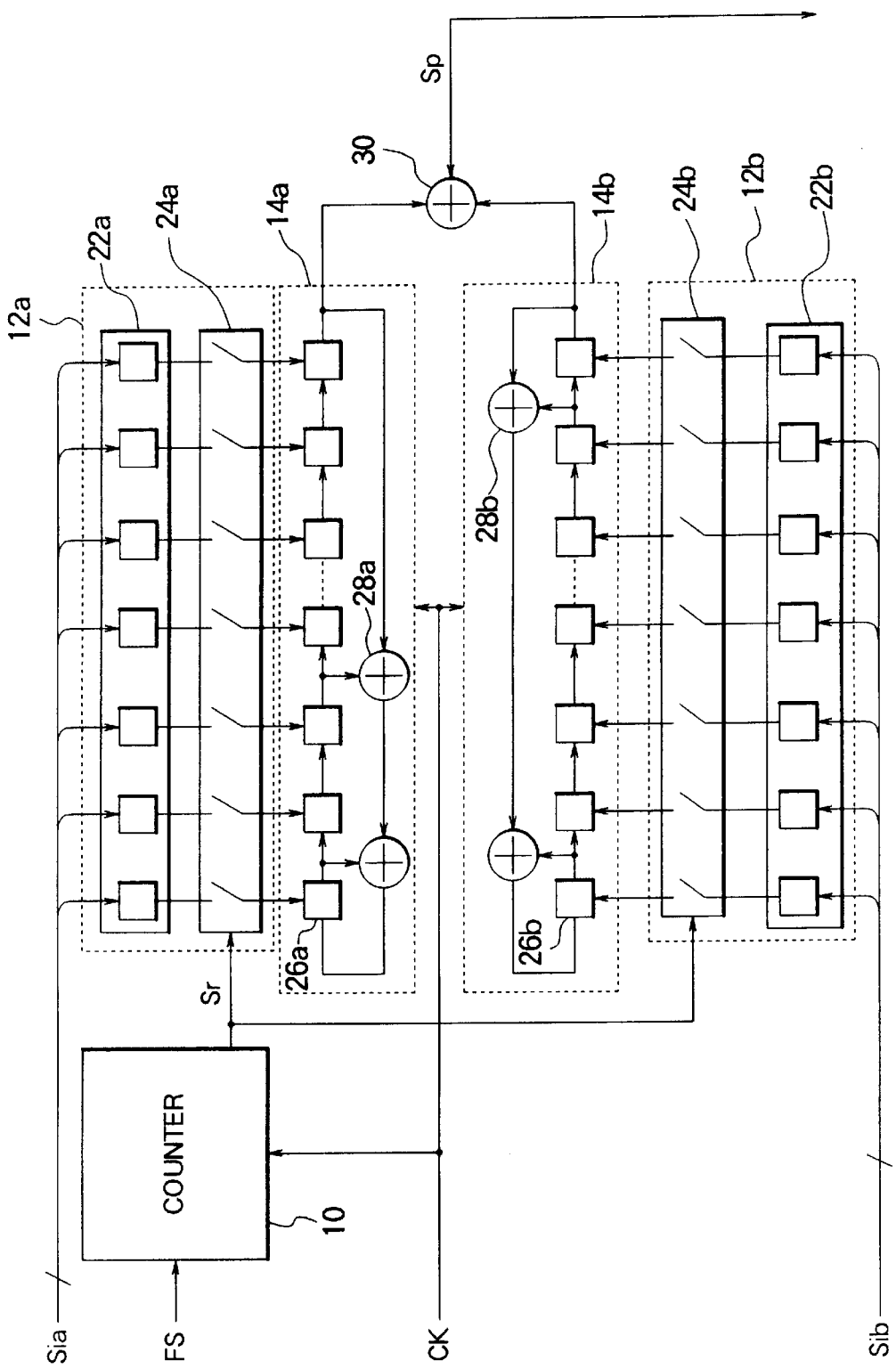
FIG. 4 is a block diagram illustrating another preferred configuration of the first code generating circuit in FIG. 1.

FIG. 4 illustrates another preferred structure of the first spreading code generating circuit 4, using the same reference numerals as in FIG. 3 to identify equivalent elements. In this structure the initialization data are divided into two parts Sia and Sib, the initializer 12 into two parts 12a and 12b, and the PN generator 14 into two linear-feedback shift registers 14a and 14b having different generator polynomials. The outputs of these linear-feedback shift registers 14a and 14b are added by a modulo-two adder 30 and output as the first spreading code Sp.

If the two linear-feedback shift registers 14a and 14b have the same numbers of latches 26a and 26b, this structure can be used to generate spreading codes (Gold codes) with small cross-correlations. If the two linear-feedback shift registers 14a and 14b have different numbers of latches, other families of codes can obtained. In either case, different first spreading codes Sp can be obtained by changing only one part of the initialization data, e.g. part Sia. The other part, e.g. part Sib, can be stored permanently, thereby reducing the amount of initialization data that must be supplied externally, and simplifying the structure of the initializer.

Next, more detailed descriptions of the structure and operation of the second spreading code generating circuit 6 will be given.

Figure 5:
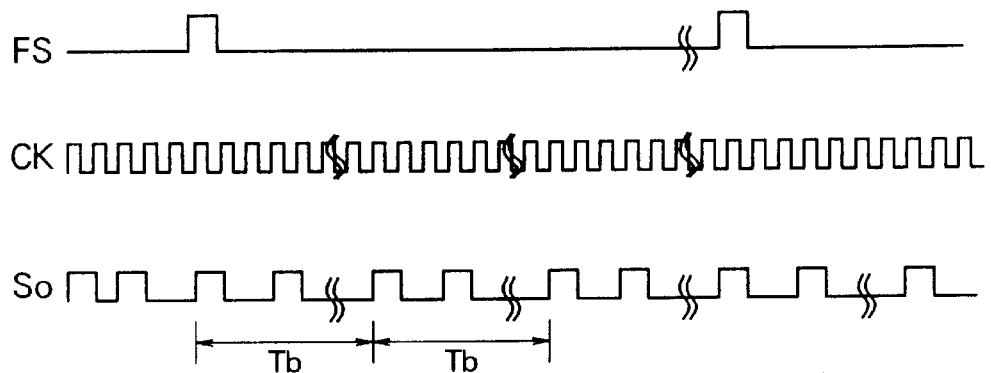
FIG. 5 is a timing diagram illustrating the operation of the second code generating circuit in FIG. 1.

Referring to FIG. 5, the second spreading code So is synchronized with the chip clock signal CK in the same way as the first spreading code Sp, but has a shorter period Tb. The period Ta of the first spreading code Sp was at least as long as the interval between framing signals FS. The period Tb of the second spreading code So is shorter than this interval. When the output spreading code Ss is used to spread a user data signal, Tb is preferably equal in length to one bit of user data. The number of chips in one period of the second spreading code So is then equal to the spreading gain.

Figure 6:
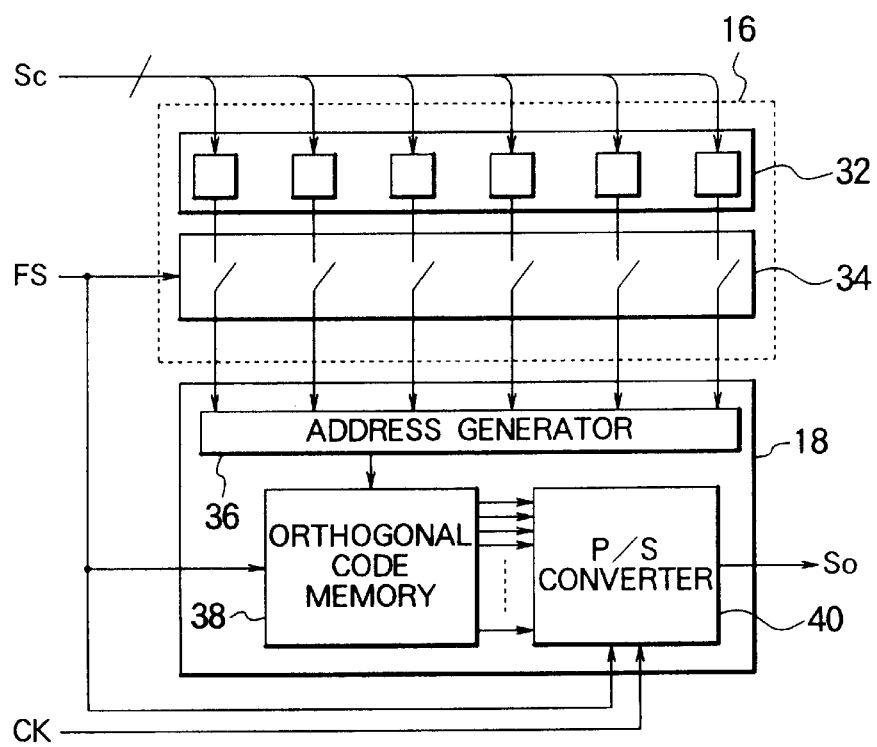
FIG. 6 is a block diagram illustrating a preferred configuration of the second code generating circuit in FIG. 1.

FIG. 6 shows one example of the structure of the second spreading code generating circuit 6. The code selector 16 comprises a register 32 and a switching circuit 34. The orthogonal code generator 18 comprises an address generator 36, an orthogonal code memory 38, and a parallel-to-serial converter 40. The orthogonal code memory 38 is, for example, a read-only memory (ROM) storing a plurality of mutually orthogonal chip sequences, such as the well-known Walsh-Hadamard sequences, at different addresses.

Briefly, the second spreading code generating circuit 6 in FIG. 6 operates as follows.

The register 32 and switching circuit 34 are similar in operation to the register 22 and switching circuit 24 in FIG. 3, except that the register 32 stores the control parameter Sc. The address generator 36 converts this parameter Sc to an address in the orthogonal code memory 38. The orthogonal code memory 38 outputs the orthogonal chip sequence stored at this address in parallel to the parallel-to-serial converter 40. The parallel-to-serial converter 40 latches the received chip sequence, then outputs the latched sequence cyclically, one chip at a time, in synchronization with the chip clock signal CK.

The framing signal FS is supplied to the switching circuit 34 and orthogonal code memory 38 to ensure that there is a known timing relationship between the first and second spreading codes Sp and So. At each framing signal FS, the orthogonal sequence selected by the control parameter Sc is supplied again to the parallel-to-serial converter 40, which commences output from the first chip of this sequence.

The second spreading code generating circuit 6 shown in FIG. 6 passes, for example, a sixty-four-chip Walsh-Hadamard sequence from the orthogonal code memory 38 to the parallel-to-serial converter 40. The orthogonal code memory 38 stores sixty-four of these sequences, which are selected by a six-bit control parameter Sc.

Some of the elements shown in FIGS. 3, 4, and 6 can be implemented in software. For example, the counter 10, initializer 12 (or 12a and 12b), and code selector 16 can be replaced by a processor programmed to count framing signals FS and supply initialization data Si and control parameters Sc at the necessary intervals.

Figure 7:
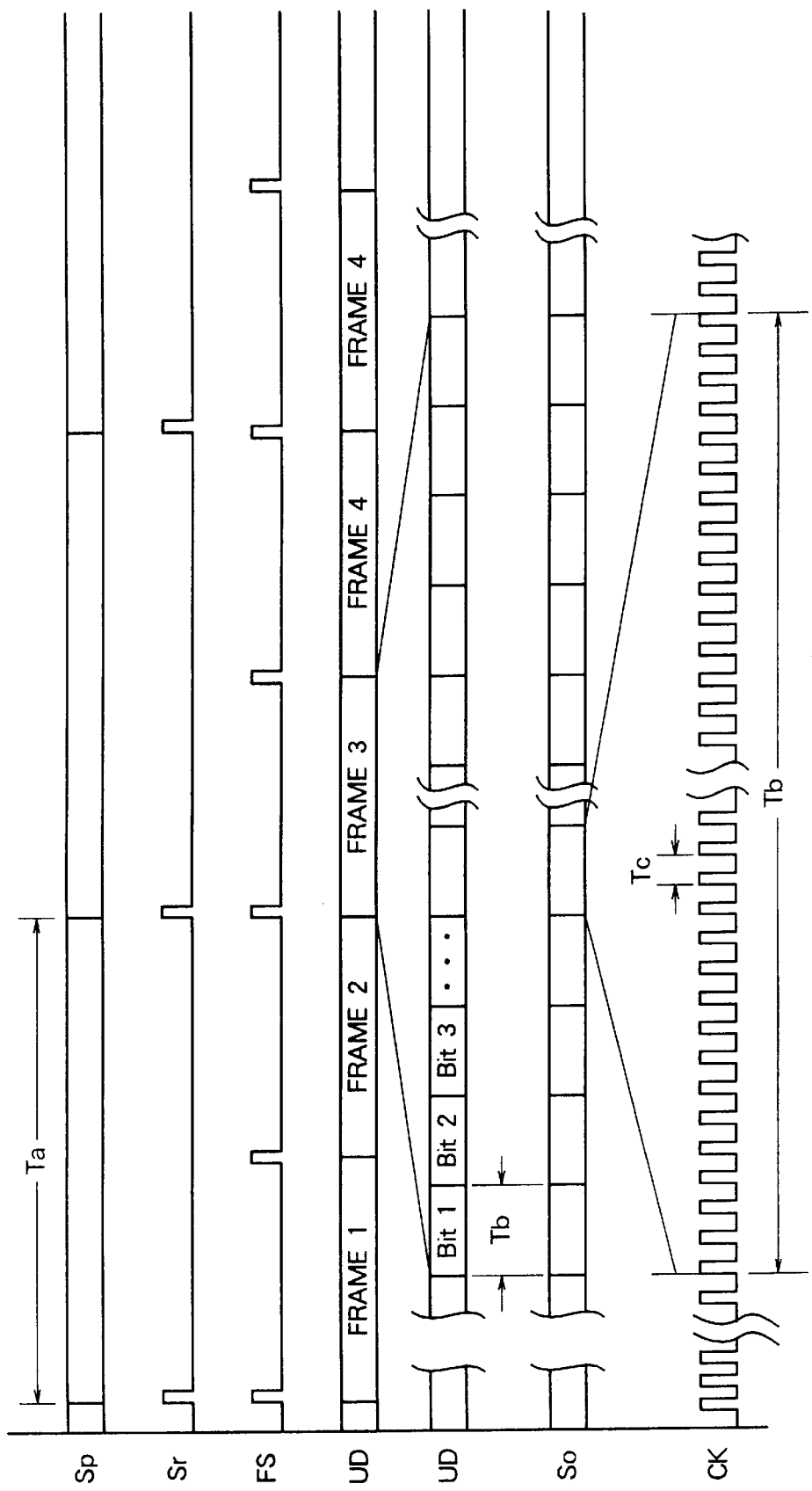
FIG. 7 is a timing diagram illustrating the timing relationships of the first and second code generating circuits in FIG. 1.

FIG. 7 shows the timing relationships between the periods Ta and Tb of the first and second spreading codes Sp and So and the frames of user data UD, for the case in which a reset signal Sr is output at every second frame indicated by framing signal FS. The period Ta of the first spreading code Sp is twice the frame length of the user data UD. Each frame of user data UD comprises a fixed number of bits, each bit having a duration Tb equal to the period of the second spreading code So. The period Tb of the second spreading code So is an integer multiple of the chip duration Tc, which is the cycle length of the chip clock CK.

Next, a CDMA communication system employing the invented spreading code generator 2 will be described.

Figure 8:
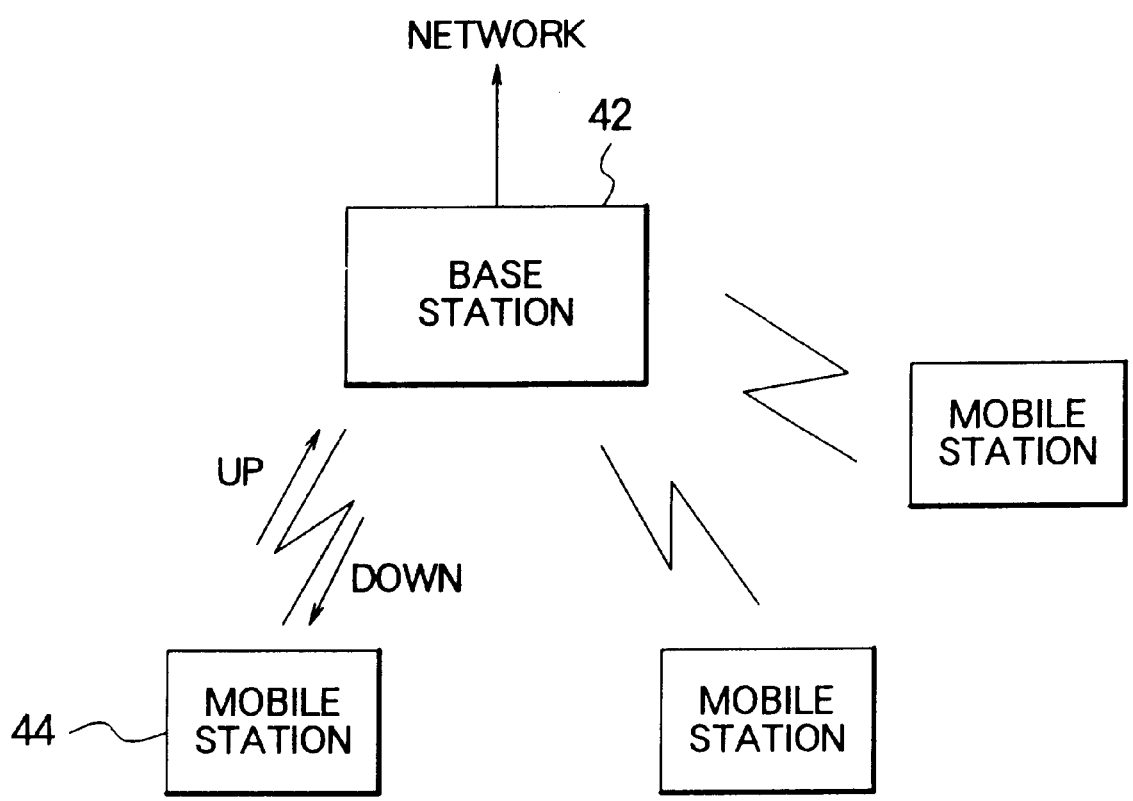
FIG. 8 illustrates the general configuration of the invented CDMA communication system.

Referring to FIG. 8, this communication system comprises at least one base station 42, which communicates with a plurality of mobile stations 44 by means of wireless links. One frequency band is used for all of the up-links from the mobile stations 44 to the base station 42, and another frequency band for all of the down-links from the base station 42 to the mobile stations 44. The base station 42 may be coupled to a wireline communication network, such as a telephone network.

Figure 9:
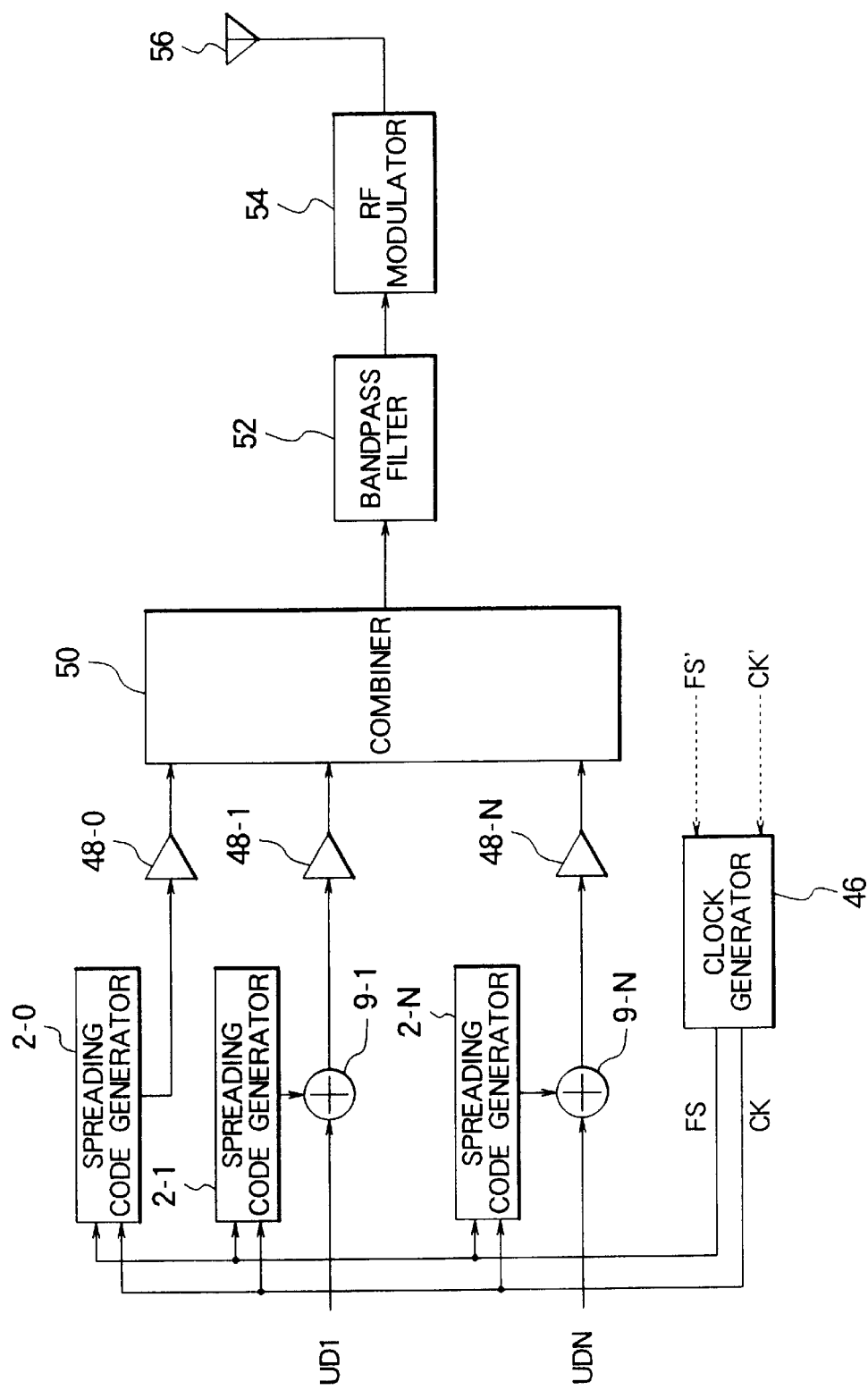
FIG. 9 is a block diagram illustrating the transmitter configuration used in the system in FIG. 8.

FIG. 9 illustrates the transmitter configuration at both the base and mobile stations. The transmitter has a plurality of spreading code generators 2-0 to 2-N of the type shown in FIG. 1. The framing signal FS and chip clock signal CK supplied to all of these spreading code generators 2-0 to 2-N are created by a clock generator 46. The spreading code output by spreading code generator 2-0 is employed as a pseudorandom synchronization signal. The spreading codes output by spreading code generators 2-1 to 2-N are supplied to modulo-two adders 9-1 to 9-N and used to spread user data UD1 to UDN.

The pseudorandom synchronization signal output by spreading code generator 2-0 and the spread user data signals output from modulo-two adders 9-1 to 9-N are amplified by respective variable-gain amplifiers 48-0 to 48-N, then combined by analog summing in a combiner 50. The frequency range of the analog signal output from the combiner 50 is limited by a bandpass filter 52; then the signal is converted to the appropriate radio frequency band by a radio-frequency modulator 54, further amplified, and transmitted from an antenna 56.

The number of spreading code generators required in a station's transmitter is equal to the number of channels transmitted by that station. The base station 42 transmits, at minimum, one user data channel for each communicating mobile station, and one channel for the base station's pseudorandom synchronization signal. A mobile Station 44 transmits, at minimum, one user data channel, and one channel for the mobile station's pseudorandom synchronization signal. The value of N in FIG. 9 may differ between the base and mobile stations.

Another difference between the base and mobile stations is that at the mobile stations, the clock generator 46 generates the framing signal FS and chip clock signal CK from a receive framing signal FS' and receive chip clock signal CK', which will be described below.

Other channels may be transmitted for purposes such as link control. A separate access channel, for example, may be used for setting up communication between the base station 42 and mobile stations 44.

Figure 10:
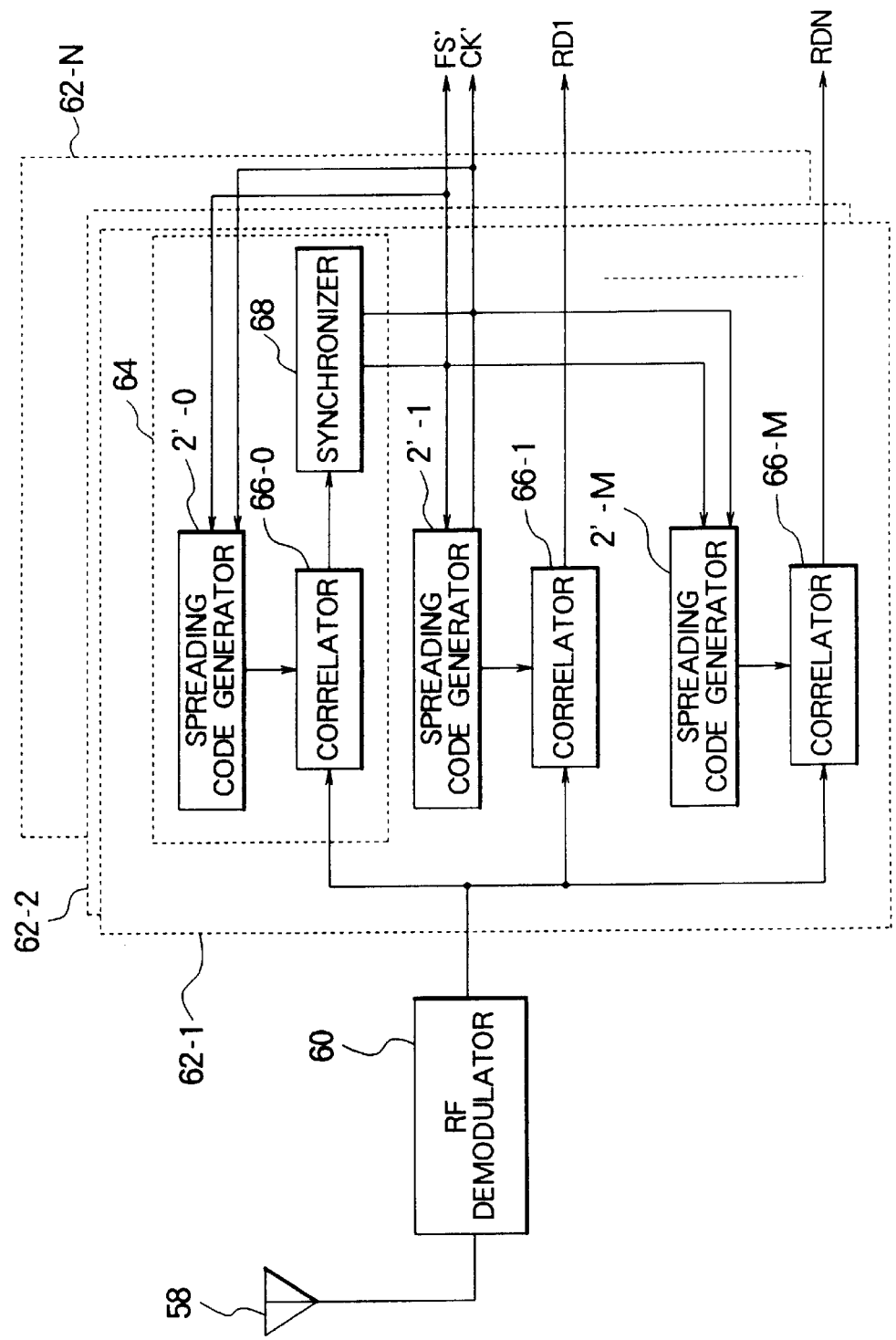
FIG. 10 is a block diagram illustrating the receiver configuration used in the system in FIG. 8.

FIG. 10 illustrates the receiver configuration in the base and mobile stations. An antenna 58 picks up a radio-frequency signal comprising incoming signals from all other stations within range. A radio-frequency demodulator 60 demodulates the appropriate radio frequency band to create a baseband signal, which is supplied to one or more spreading demodulators 62-1 to 62-N. The base station 42 requires one spreading demodulator for each communicating mobile station 44. A mobile station 44 normally requires only one spreading demodulator 62-1.

Each spreading demodulator has a synchronization acquisition and tracking circuit 64 comprising a spreading code generator 2'-0, correlator 66-0, and synchronizer 68. Each spreading demodulator also has one or more additional spreading code generators 2'-1 to 2'-M, and correlators 66-1 to 66-M. The synchronizer 68 outputs a receive framing signal FS' and receive chip clock signal CK' to all of the spreading code generators 2-0 to 2-M, for use as the signals FS and CK shown in FIG. 1. At a mobile station 44, the receive framing signal FS' and receive chip clock signal CK' are additionally supplied to the clock generator 46 in the transmitter.

Each correlator 66-i correlates the received baseband signal with the spreading code output by the corresponding spreading code generator 2'-i (i=0 to M). If the spreading code is regarded, for the moment, as taking on values of plus and minus one, the correlation operation comprises multiplying the baseband signal by the spreading code and integrating and dumping the result over a certain interval of time. In the first correlator 66-0 this interval of time is, for example, the period Ta of the first spreading code Sp. In correlators 66-1 to 66-M, this interval of time is normally the period Tb of the second spreading code So, i.e. the duration of one data bit. The correlators use the receive framing signal FS' for bit synchronization and frame synchronization, although this is not explicitly indicated in the drawing.

Next the operation of the invented CDMA communication system will be described. The spreading code generators in the transmitter and receiver at each station will be referred to as transmit spreading code generators and receive spreading code generators, respectively.

Different initialization data Si are assigned to each of the mobile stations 44 in communication with the base station 42. The initialization data Si assigned to the i-th mobile station 44 are stored in the initializers 12 of all of the transmit spreading code generators 2-0, 2-1, . . . at that mobile station 44. The same initialization data Si are also stored in the initializers 12 of all of the receive spreading code generators 2'-0, 2'-1, . . . of the spreading demodulator 62-i used at the base station 42 for demodulating signals from that particular mobile station 44.

Initialization data Si are also assigned to the base station 42, stored in the initializers 12 of all of the transmit spreading code generators 2-0 to 2-N at the base station 42, and stored in all of the receive spreading code generators 2'0, 2'1, . . . at all of the mobile stations 44. The initialization data Si assigned to the base station 42 may be different from all of the initialization data Si assigned to the mobile stations 44, but this is not essential when different radio frequencies are used on the up-links and down-links.

Different channels transmitted by the same station are distinguished by different control parameters Sc. Normally a fixed control parameter selecting, for example, an all-zero code is assigned to the channel on which the pseudorandom synchronization signal is transmitted. This fixed control parameter value is stored permanently in the code selectors 16 of the first spreading code generators 2-0 and 2'-0 in the transmitters and receivers at all stations.

The spreading code Ss resulting from modulo-two addition of the second spreading code So selected by this fixed control parameter and the first spreading code Sp assigned to a particular station is used as that station's pseudorandom synchronization signal. If the second spreading code So is the all-zero code, a station's pseudorandom synchronization signal is identical to the first spreading code Sp generated from that station's assigned initialization data.

A different control parameter Sc is assigned to each mobile station 44, for use on the down-link from the base station to that mobile station. At the base station 42, this control parameter is set in the code selector 16 of one transmit spreading code generator 2-i, which is used for spreading data sent to that mobile station 44. At the mobile station 44, this control parameter Sc is set in the code selector 16 of, for example, receive spreading code generator 2'-1.

A control parameter Sc for spreading user data on the up-link must also be assigned and set in, for example, transmit spreading code generator 2-1 at the motile station 44, and the receive spreading code generator 2'-i used for receiving data from that mobile station 44 at the base station 42. This up-link control parameter Sc may be the same as the down-link control parameter Sc assigned to the same mobile station 44. Alternatively, a fixed up-link control parameter Sc may be used for all mobile stations.

These control parameters establish synchronization channels and user data channels. If other channels are transmitted between the base station 42 and mobile stations 44, control parameters Sc are assigned to these other channels in a manner similar to the above.

The initialization data Si and control parameters Sc may be permanently assigned, or they may be assigned by the base station 42 during the set-up of communications with the mobile stations 44.

Referring now to FIG. 11, in communication between the base station 42 and a mobile station 44, the mobile station 44 begins by establishing synchronization with the base station 42 (step 70). In the mobile station's receiver, the first correlator 66-0 correlates the received baseband signal with the base station's known pseudorandom synchronization signal, which is output by the mobile station's receive spreading code generator 2'-0, and the synchronizer 68 adjusts the timing of the receive framing signal FS' and receive clock signal CK' until a maximum correlation value is obtained. At this point, FS' and CK' are in substantial synchronization with the framing signal FS and chip clock signal CK generated by the clock generator 46 in the base station's transmitter, with an allowance for the signal propagation delay between the two stations.

Thereafter, the synchronizer 68 continues to track the base station's pseudorandom synchronization signal and adjust the timing of FS' and CK' as necessary to maintain maximum correlation. FS' and CK' are supplied to the clock generator 46 in the mobile station's transmitter, so the mobile station's transmit framing signal FS and chip clock signal CK are also in substantial synchronization with the base station's framing signal FS and chip clock signal CK.

When synchronization is achieved, the mobile station 44 sets its first variable-gain amplifier 48-0 to a certain comparatively high gain level and begins transmitting its own pseudorandom synchronization signal (step 72).

The base station 42 now synchronizes with the mobile station's pseudorandom synchronization signal in the same way that the mobile station 44 synchronized with the base station's pseudorandom synchronization signal. Specifically, the spreading code generator 2'-0 in the synchronization acquisition and tracking circuit 64 of one of the base station's spreading demodulators 62-i generates the mobile station's pseudorandom synchronization signal, and the synchronizer 68 in that spreading demodulator 62-i adjusts the phase of the receive framing signal FS' and chip clock signal CK'.

This synchronization step 74 can be completed rapidly, because the mobile station's pseudorandom synchronization signal is already approximately synchronized to the base station's framing signal FS. Allowing for the round-trip propagation delay between the base station 42 and mobile station 44, the synchronizer 68 only has to search in a short interval behind the base station's own FS timing to find the timing of the mobile station's pseudorandom synchronization signal.

When synchronization has been accomplished in step 74, the base station 42 sends the mobile station 44 a command instructing the mobile station 44 to reduce the power of its pseudorandom synchronization signal (step 76). The mobile station 44 responds by, for example, reducing the gain of its first variable-gain amplifier 48-0, or by reducing the gain and switching the variable-gain amplifier 48-0 intermittently on and off. Reducing the power of the variable-gain amplifier 48-0 reduces interference in other up-link channels.

The base station 42 and mobile station 44 now proceed to transmit and receive user data (step 78). For transmitting data, the base station 42 uses one of its transmit spreading code generators 2-1 to 2-N and variable-gain amplifiers 48-1 to 48-N. The mobile station 44 uses, for example, its transmit spreading code generator 2-1 and variable-gain amplifier 48-1. For receiving data, the base station uses, for example, receive spreading code generator 2'-1 and correlator 2'-1 in the above-mentioned spreading demodulator 62-i, while the mobile station 44 uses, for example, the receive spreading code generator 2'-1 and correlator 66-1 in its single spreading demodulator 62-1.

One advantage of the invented CDMA communication system is that, since every station transmits a synchronization signal, synchronous demodulation can be used at both the base and mobile stations. Furthermore, even if asynchronous demodulation is employed, it is still an advantage for a spreading demodulator to be able to use a single received synchronization signal with a known chip sequence to establish bit synchronization, frame synchronization, and spreading-code synchronization, instead of having to extract these synchronization timings from the incoming user data signal, which has an unpredictable chip sequence.

During communication, synchronization may be lost due to signal obstruction or fading. The base station 42 is particularly prone to loss of synchronization, because the power of the mobile station's pseudorandom synchronization signal has been reduced. An additional advantage of the invented communication system is that the base station 42 is able to resynchronize quickly, because the timing of the mobile station's pseudorandom synchronization signal can normally be found close to the base stations framing-signal timing.

A further advantage is that the invented spreading code generator enables each mobile station to have a unique pseudorandom synchronization signal, so that even if a mobile station loses synchronization and transmits a pseudorandom synchronization signal at an unexpected timing, the base station will not confuse this pseudorandom synchronization signal with the pseudorandom synchronization signal of another mobile station. Unique pseudorandom synchronization signals are assigned by providing each mobile station with initialization data Si such that the pseudorandom synchronization signals of different mobile stations comprise non-overlapping parts of the common maximum-length sequence output by all of the PN code generators 14.

Another advantage is that the signals transmitted from the same station on different channels are mutually orthogonal, because the different spreading codes So output by the orthogonal code generator 18 are mutually orthogonal. In particular, there is no co-channel interference on the down-link, because all channels transmitted by the base station 42 have mutually orthogonal spreading codes. On the up-link, interference is reduced to the extent that the different channels transmitted from the same mobile station 44 do not interfere with one another. In particular, the pseudorandom synchronization signal transmitted from a mobile station 44 does not interfere with the user data signal transmitted by the same mobile station 44.

Yet another advantage is that, by using spreading code generators capable of generating a large number of different spreading codes, and by reducing interference as described above, the invented system enables a base station to communicate simultaneously with a large number of mobile stations.

Still another advantage is that a single spreading code generator design suffices to generate all of the spreading codes needed in the system. This in turn permits the correlators at both the base and mobile stations to have the same design. Overall system cost is thereby reduced, as the manufacturer needs to design and manufacture fewer different types of devices.

The invented spreading code generator and CDMA communication system are not restricted to the embodiments described above. Codes of types other than the Walsh-Hadamard type, including Bose-Chaudhuri-Hocquenghem (BCH) codes, Reed-Solomon codes, and other codes known from error-correcting theory, may be employed as the second internal spreading code. No restriction is placed on the periods of the internal spreading codes, or on the period of the PN sequence from which the first internal spreading code may be generated. The transmitter and receiver structures in the invented CDMA communication system are not restricted to those shown in FIGS. 9 and 10. The structures of the first and second spreading code generating circuits are not restricted to those shown in FIGS. 3, 4, and 6. It is not necessary to use different frequency bands for the up-links and down-links, provided the base and mobile stations are distinguished by different initialization data. Those skilled in the art will recognize that many variations are possible within the scope of the invention as claimed below.

What is claimed is:

1. A spreading code generator for generating a spreading code responsive to initialization data and a control parameter, in synchronization with a chip clock signal and a framing signal, comprising:

a first spreading code generating circuit for generating a first spreading code in synchronization with said chip clock signal, starting from an initial state determined by said initialization data, and reassuming said initial state at intervals equal to a fixed integer multiple of one period of said framing signal;

a second spreading code generating circuit for repeatedly generating a second spreading code in synchronization with said chip clock signal, said second spreading code being selected by said control parameter and having a period shorter than a period of said framing signal; and a modulo-two adder coupled to said first spreading code generating circuit and said second spreading code generating circuit, for performing a modulo-two summing operation on said first spreading code and said second spreading code, thereby producing a third spreading code for output from said spreading code generator.

2. A spreading code generator for generating a spreading code responsive to initialization data and a control parameter, in synchronization with a chip clock signal and a framing signal, comprising:

a first spreading code generating circuit for generating a first spreading code in synchronization with said chip clock signal, starting from an initial state determined by said initialization data, and reassuming said initial state responsive to said framing signal;

a second spreading code generating circuit for repeatedly generating a second spreading code in synchronization with said chip clock signal, said second spreading code being selected by said control parameter and having a period shorter than a period of said framing signal; and a modulo-two adder coupled to said first spreading code generating circuit and said second spreading code generating circuit, for performing a modulo-two summing operation on said first spreading code and said second spreading code, thereby producing a third spreading code for output from said spreading code generator;

wherein said second spreading code generating circuit has an initializer for storing said initialization data;

a pseudorandom noise generator for generating a pseudorandom noise sequence; and a counter for counting said framing signal and generating a reset signal, at intervals determined by said framing signal, causing the initialization data stored in said initializer to be loaded into said pseudorandom noise generator.

3. The spreading code generator of claim 2, wherein said pseudorandom noise generator comprises a linear-feedback shift register.

4. The spreading code generator of claim 3, wherein said pseudorandom noise sequence is a maximum-length sequence.

5. The spreading code generator of claim 2, wherein said pseudorandom noise generator comprises:

a pair of linear-feedback shift registers having different generator polynomials, for generating two different pseudorandom noise sequences; and a modulo-two adder coupled to said pair of linear-feedback shift registers, for summing said two different pseudorandom noise sequences.

6. The spreading code generator of claim 5, wherein said pair of linear-feedback shift registers generate sequences with mutually equal periods.

7. The spreading code generator of claim 5, wherein said pair of linear-feedback shift registers generate sequences with mutually unequal periods.

8. A spreading code generator for generating a spreading code responsive to initialization data and a control parameter, in synchronization with a chip clock signal and a framing signal, comprising:

a first spreading code generating circuit for generating a first spreading code in synchronization with said chip clock signal, starting from an initial state determined by said initialization data, and reassuming said initial state responsive to said framing signal;

a second spreading code generating circuit for repeatedly generating a second spreading code in synchronization with said chip clock signal, said second spreading code being selected by said control parameter and having a period shorter than a period of said framing signal; and a modulo-two adder coupled to said first spreading code generating circuit and said second spreading code generating circuit, for performing a modulo-two summing operation on said first spreading code and said second spreading code, thereby producing a third spreading code for output from said spreading code generator;

wherein said second spreading code generating circuit has a code selector for storing said control parameter; and an orthogonal code memory coupled to said code selector, for storing a plurality of mutually orthogonal sequences, and providing as output a selectable one of said mutually orthogonal sequences, responsive to the control parameter stored in said code selector.

9. The spreading code generator of claim 8, wherein said orthogonal code memory provides said mutually orthogonal sequences as output in parallel form, further comprising:

a parallel-to-serial converter coupled to said orthogonal code memory, for converting said mutually orthogonal sequences from parallel to serial form.

10. The spreading code generator of claim 9, wherein said plurality of mutually orthogonal sequences are Walsh-Hadamard sequences.

11. A direct-sequence code-division multiple-access communication system having a plurality of stations, each of said stations transmitting signals on at least two channels distinguished by different spreading codes, each of said stations demodulating a received radio-frequency signal to a baseband signal, and each of said stations separately comprising:

at least two transmit spreading code generators of mutually identical structure, for outputting said different spreading codes;

a clock generator coupled to said transmit spreading code generators, for supplying a transmit chip clock signal and a transmit framing signal to said transmit spreading code generators;

at least two receive spreading code generators identical in structure to said transmit spreading code generators, for outputting spreading codes;

at least two correlators coupled to respective receive spreading code generators, for correlating said baseband signal with the spreading codes output by respective receive spreading code generators and outputting respective despread signals; and at least one synchronizer coupled to one of said correlators, for supplying a receive chip clock signal and a receive framing signal to at least two of said receive spreading code generators, responsive to the despread signal output by said one of said correlators;

wherein each of said transmit spreading code generators and each of said receive spreading code generators separately has:

a first spreading code generating circuit for generating a first internal spreading code in synchronization with a supplied chip clock signal, starting from an initial state determined by assigned initialization data, and reassuming said initial state responsive to a supplied framing signal;

a second spreading code generating circuit for repeatedly generating a second internal spreading code in synchronization with said supplied chip clock signal and said supplied framing signal, said second internal spreading code being selected by a control parameter and having a repeating period shorter than a repeating period of said framing signal; and a modulo-two adder coupled to said first spreading code generating circuit and said second spreading code generating circuit, for performing a modulo-two summing operation on said first internal spreading code and said second internal spreading code, thereby producing the spreading code output from said spreading code generator;

the chip clock signal supplied to said transmit spreading code generators being said transmit chip clock signal;

the chip clock signal supplied to said receive spreading code generators being said receive chip clock signal;

the framing signal supplied to said transmit spreading code generators being said transmit framing signal; and the framing signal supplied to said receive spreading code generators being said receive framing signal.

12. The system of claim 11, wherein the transmit spreading code generators at any one station among said plurality of stations have identical initialization data, but different control parameters.

13. The system of claim 12, wherein the second spreading codes selected by said control parameters are mutually orthogonal.

14. The system of claim 11, wherein said first spreading code generating circuit comprises a pseudorandom noise generator for generating a pseudorandom noise sequence, of which said first internal spreading code forms one part.

15. The system of claim 14, wherein said initialization data are assigned so that the first internal spreading codes generated at different stations form non-overlapping parts of said pseudorandom noise sequence.

16. The system of claim 11, wherein at each station among said plurality of stations, the spreading code output by one of said transmit spreading code generators is transmitted as a pseudorandom synchronization signal, and the spreading code output by at least one other transmit spreading code generator is used for spreading user data.

17. The system of claim 16, wherein said stations are classified as base stations and mobile stations, and communication is carried out so that all of said mobile stations transmit said signals to said base stations in one frequency band, and all of said base stations transmit said signals to said mobile stations in another one frequency band.

18. The system of claim 17, wherein each of said mobile stations has a single synchronizer, said single synchronizer supplies said receive framing signal to said clock generator, and said clock generator synchronizes said transmit framing signal with said receive framing signal.

19. The system of claim 17, wherein each of said mobile stations has a variable-gain amplifier for amplifying said pseudorandom synchronization signal, said pseudorandom synchronization signal being transmitted at a first power level to enable one of said base stations to acquire synchronization, then at a second power level lower than said first power level to enable said one of said base stations to maintain synchronization.

20. A spreading code generator for receiving initialization data, a control parameter, a chip clock signal, and a framing signal, and generating therefrom a spreading code for spreading a signal for transmission from a mobile station to a base station in a direct-sequence code-division multiple-access communication system having a plurality of mobile stations, in which each mobile station transmits signals on at least two channels, comprising:

a first spreading code generating circuit for generating a first spreading code in synchronization with said chip clock signal, starting from an initial state determined by said initialization data, and reassuming said initial state at intervals equal to a fixed integer multiple of one period of said framing signal;

a second spreading code generating circuit for repeatedly generating a second spreading code in synchronization with said chip clock signal, said second spreading code being selected by said control parameter and having a period shorter than a period of said framing signal; and a modulo-two adder coupled to said first spreading code generating circuit and said second spreading code generating circuit, for performing a modulo-two summing operation on said first spreading code and said second spreading code, thereby producing a third spreading code for output from said spreading code generator; wherein said initialization data uniquely identify said mobile station; and said control parameter uniquely identifies a particular channel transmitted from said mobile station to said base station.

21. A spreading code generator for receiving initialization data, a control parameter, a chip clock signal, and a framing signal, and generating therefrom a spreading code for spreading a signal for transmission from a mobile station to a base station in a direct-sequence code-division multiple-access communication system having a plurality of mobile stations, in which each mobile station transmits signals on at least two channels, comprising:

a first spreading code generating circuit for generating a first spreading code in synchronization with said chip clock signal, starting from an initial state determined by said initialization data, and reassuming said initial state responsive to said framing signal;

a second spreading code generating circuit for repeatedly generating a second spreading code in synchronization with said chip clock signal, said second spreading code being selected by said control parameter and having a period shorter than a period of said framing signal; and a modulo-two adder coupled to said first spreading code generating circuit and said second spreading code generating circuit, for performing a modulo-two summing operation on said first spreading code and said second spreading code, thereby producing a third spreading code for output from said spreading code generator; wherein said initialization data uniquely identify said mobile station; and said control parameter uniquely identifies a particular channel transmitted from said mobile station to said base station;

wherein said first spreading code generator has an initializer for storing said initialization data;

a pseudorandom noise generator for generating a pseudorandom noise sequence; and a counter for counting said framing signal and generating a reset signal, at intervals determined by said framing signal, causing the initialization data stored in said initializer to be loaded into said pseudorandom noise generator.

22. The spreading code generator of claim 21, wherein said pseudorandom noise generator comprises a linear-feedback shift register.

23. The spreading code generator of claim 22, wherein said pseudorandom noise sequence is a maximum-length sequence.

24. The spreading code generator of claim 21, wherein said pseudorandom noise generator comprises:

a pair of linear-feedback shift registers having different generator polynomials, for generating two different pseudorandom noise sequences; and a modulo-two adder coupled to said pair of linear-feedback shift registers, for summing said two different pseudorandom noise sequences.

25. The spreading code generator of claim 24, wherein said pair of linear-feedback shift registers generate sequences with mutually equal periods.

26. The spreading code generator of claim 24, wherein said pair of linear-feedback shift registers generate sequences with mutually unequal periods.

27. A spreading code generator for receiving initialization data, a control parameter, a chip clock signal, and a framing signal, and generating therefrom a spreading code for spreading a signal for transmission from a mobile station to a base station in a direct-sequence code-division multiple-access communication system having a plurality of mobile stations, in which each mobile station transmits signals on at least two channels, comprising:

a first spreading code generating circuit for generating a first spreading code in synchronization with said chip clock signal, starting from an initial state determined by said initialization data, and reassuming said initial state responsive to said framing signal;

a second spreading code generating circuit for repeatedly generating a second spreading code in synchronization with said chip clock signal, said second spreading code being selected by said control parameter and having a period shorter than a period of said framing signal; and a modulo-two adder coupled to said first spreading code generating circuit and said second spreading code generating circuit, for performing a modulo-two summing operation on said first spreading code and said second spreading code, thereby producing a third spreading code for output from said spreading code generator; wherein said initialization data uniquely identify said mobile station; and said control parameter uniquely identifies a particular channel transmitted from said mobile station to said base station;

wherein said second spreading code generating circuit has a code selector for storing said control parameter; and an orthogonal code memory coupled to said code selector, for storing a plurality of mutually orthogonal sequences, and providing as output a selectable one of said mutually orthogonal sequences, responsive to the control parameter stored in said code selector.

28. The spreading code generator of claim 27, wherein said orthogonal code memory provides said mutually orthogonal sequences as output in parallel form, further comprising:

a parallel-to-serial converter coupled to said orthogonal code memory, for converting said mutually orthogonal sequences from parallel to serial form.

29. The spreading code generator of claim 28, wherein said plurality or mutually orthogonal sequences are Walsh-Hadamard sequences.

30. A spreading code generator for generating a spreading code responsive to initialization data and a control parameter, in synchronization with a chip clock signal and a framing signal, comprising:

means for generating a first spreading code in synchronization with said chip clock signal, starting from an initial state determined by said initialization data, and reassuming said initial state at intervals equal to a fixed integer multiple of one period of said framing signal;

means for repeatedly generating a second spreading code in synchronization with said chip clock signal, said second spreading code being selected by said control parameter and having a period shorter than a period of said framing signal; and means for performing a modulo-two summing operation on said first spreading code and said second spreading code, thereby producing a third spreading code for output from said spreading code generator.

* * * * *